(12) United States Patent
Williams

(10) Patent No.: US 7,295,153 B2
(45) Date of Patent: Nov. 13, 2007

(54) ACOUSTO-RADIO FREQUENCY MODULATOR AND APPLICATIONS THEREFORE

(75) Inventor: Brett A Williams, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 352 days.

(21) Appl. No.: 10/953,297

(22) Filed: Sep. 29, 2004

(65) Prior Publication Data

US 2006/0066476 A1 Mar. 30, 2006

(51) Int. Cl.
*H03C 7/02* (2006.01)
*G01S 7/28* (2006.01)

(52) U.S. Cl. ......................... 342/175; 342/52

(58) Field of Classification Search ................ 342/175, 342/52
See application file for complete search history.

(56) References Cited

U.S. PATENT DOCUMENTS

| | | | |
|---|---|---|---|
| 4,699,466 A * | 10/1987 | Brandstetter et al. | 359/308 |
| 4,759,613 A * | 7/1988 | Fox | 359/313 |
| 5,153,597 A * | 10/1992 | Hueber et al. | 342/192 |
| 5,734,578 A * | 3/1998 | Oh | 702/77 |
| 6,625,381 B2 * | 9/2003 | Roddy et al. | 385/147 |

* cited by examiner

*Primary Examiner*—Thomas H. Tarcza
*Assistant Examiner*—Matthew M Barker
(74) *Attorney, Agent, or Firm*—Williams, Morgan & Amerson, P.C.

(57) ABSTRACT

An acousto-radio frequency modulator and an apparatus employing the same are disclosed. The acousto-radio frequency modulator includes a radiowave waveguide including a first end defining an input and a second end defining an output; an acousto-radio material positioned in the signal path of the radiowave waveguide; and a acoustic source coupled to the acousto-radio material and capable of driving an acoustic signal through the acousto-radio material. The apparatus includes a plurality of ARFMs, each capable of modulating a component of a received RADAR signal received by the antenna; a frequency combiner capable of frequency multiplexing each of the components into a combined signal; a filter capable of filtering the combined signal; an amplifier capable of amplifying the filtered signal; and an analog to digital converter capable of converting the amplified signal to a digital representation.

55 Claims, 11 Drawing Sheets

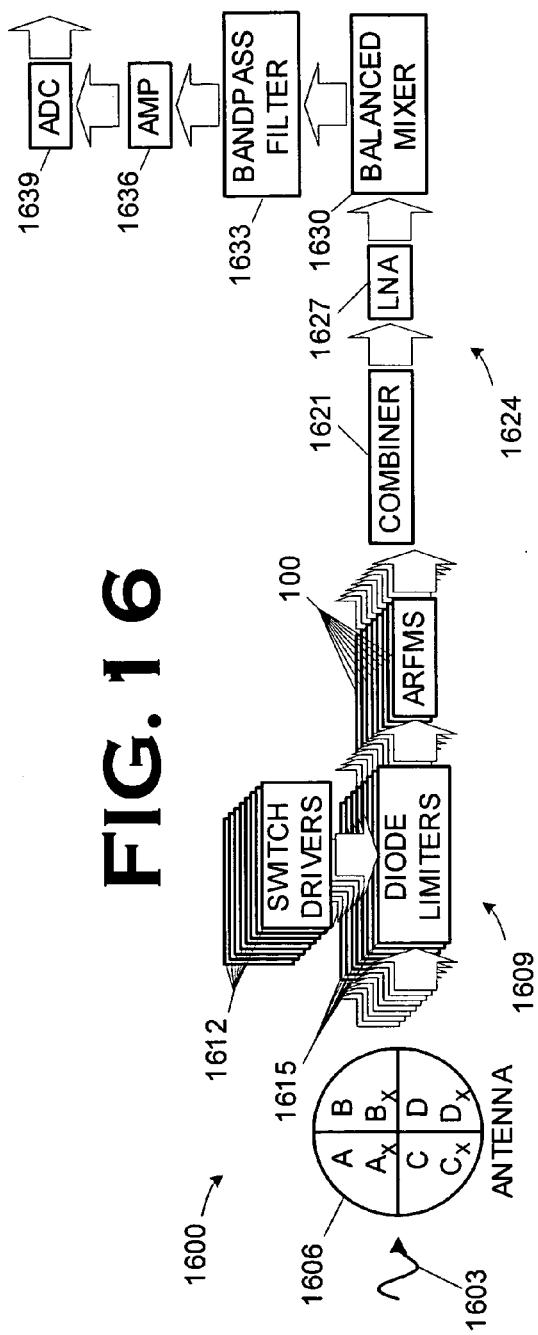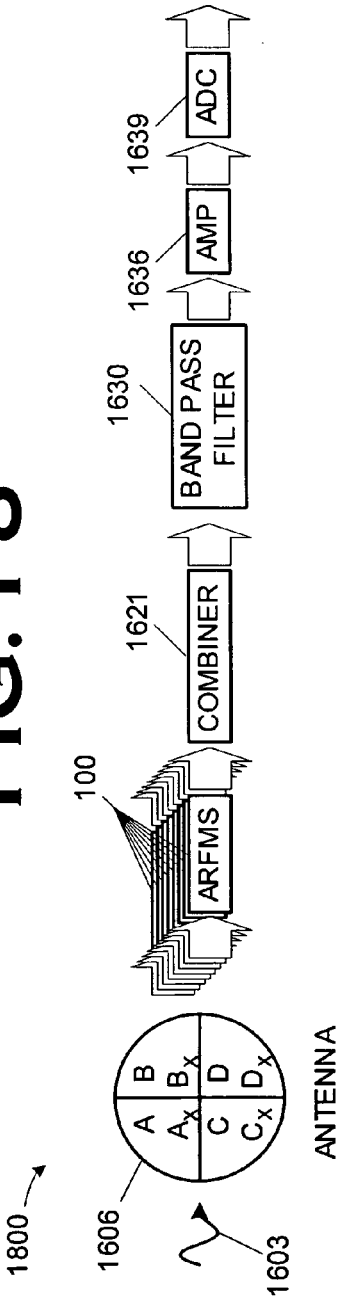

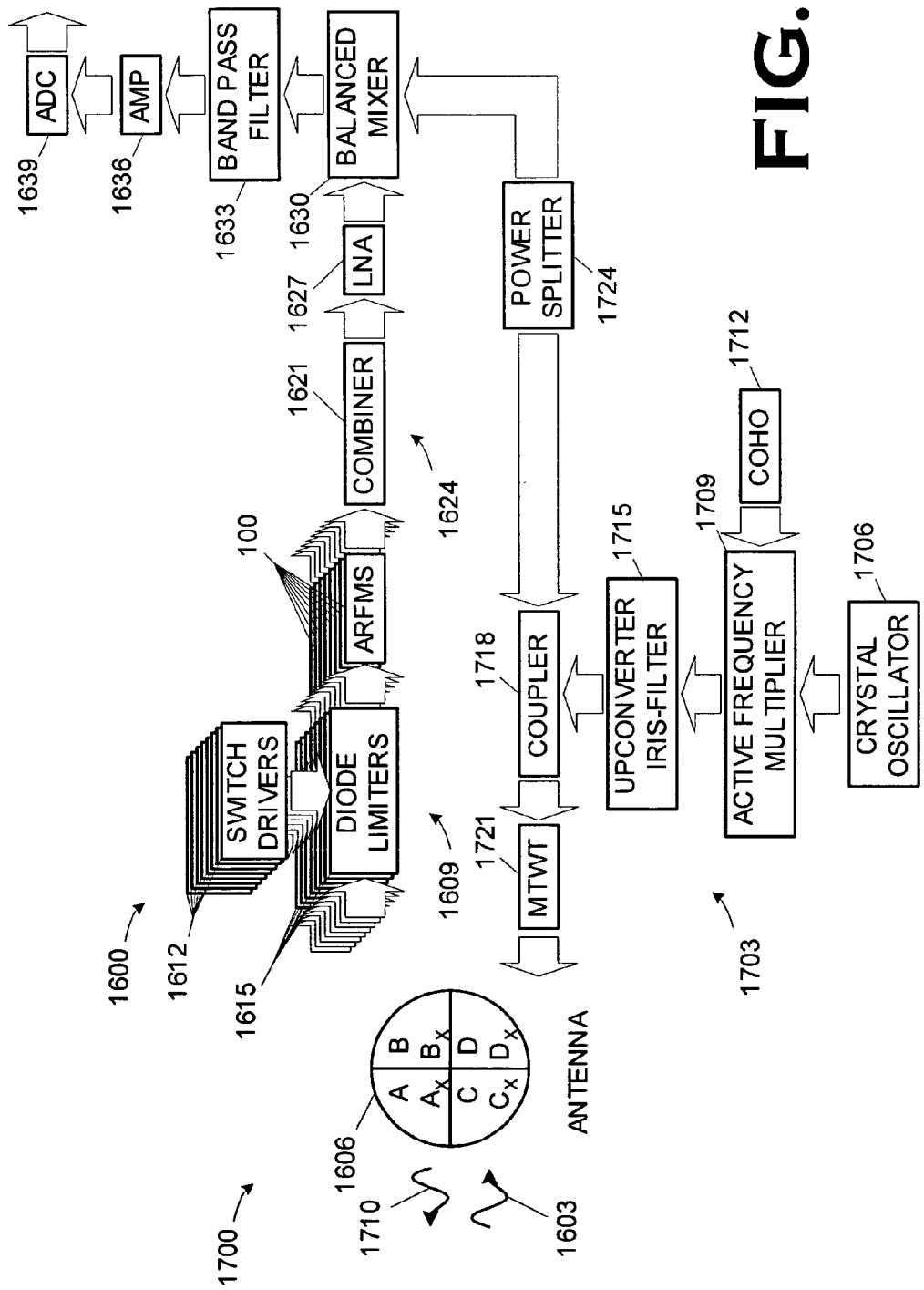

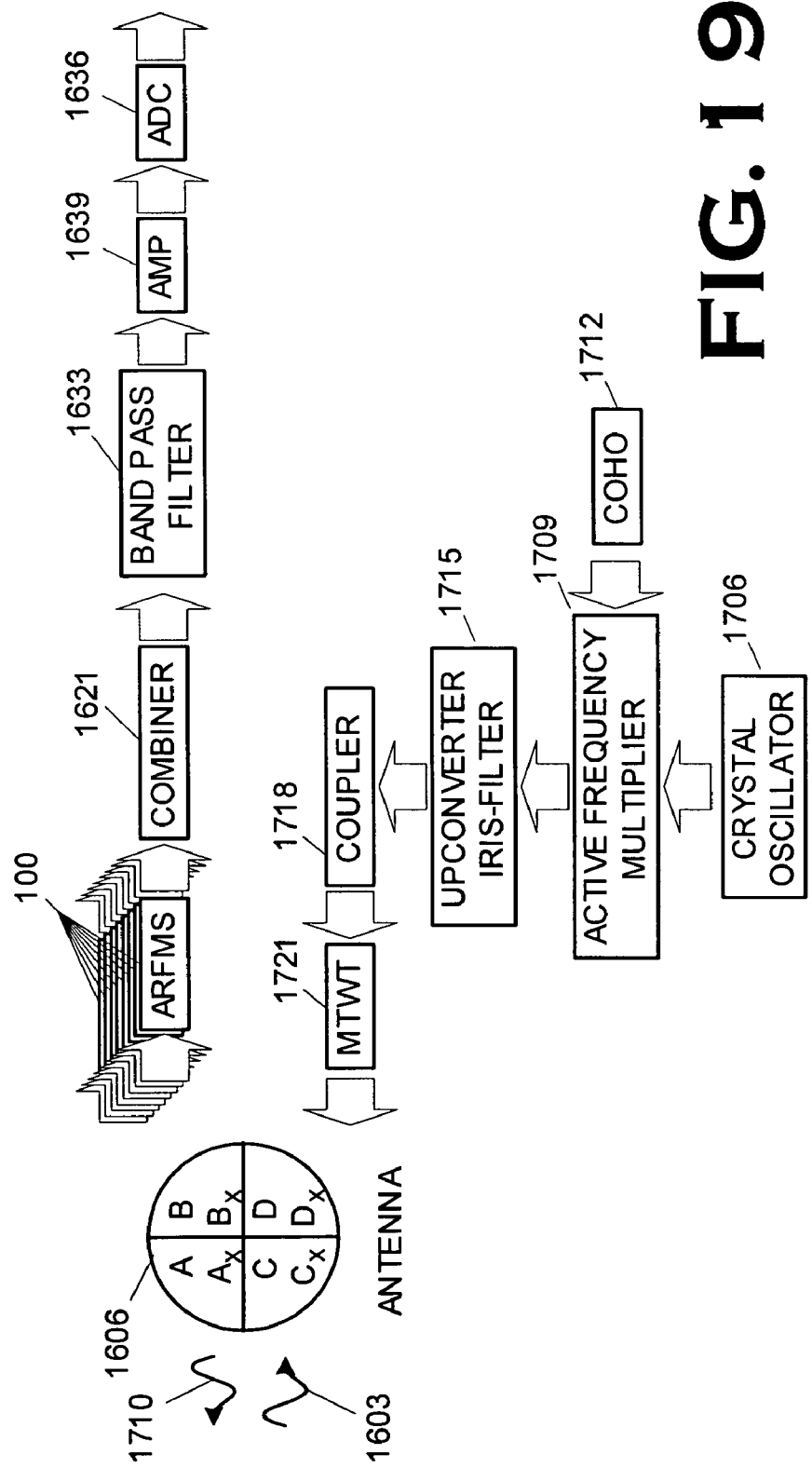

ACOUSTO-RADIO FREQUENCY MODULATOR AND APPLICATIONS THEREFORE

BACKGROUND OF THE INVENTION

1. Field of the Invention

The present invention pertains to a radio-frequency modulator and, more particularly, to an acousto-radio frequency modulator.

2. Description of the Related Art

In the laser modulation arena a standard tool for frequency shifting is called the acousto-optic modulator ("AOM") or more specifically acousto-optic frequency shifter as AOM's can be used for a variety of functions including not only frequency shift but fast beam displacement over multiple physical communication channels and amplitude modulation. For instance, AOMs can shift a light beam by a specific frequency through Brillouin scattering and do so by only the sum or difference of the modulation frequency with no inter-modulation products. The modulating frequency is that of an acoustic wave transmitted through a transparent medium which a passing laser beam interacts with, acquiring a component of the medium's movement as a Doppler shift added to or subtracted from that of the laser.

No such device exists for radio frequencies ("RF"). RF applications instead use what are referred to as "diode mixers", which are non-linear, for their fast switching frequencies. If an RF modulator were available, "mixing" of RF and audio frequencies could take place without the complexities associated therewith. Square-wave on/off RF switching driven by a local oscillator is what gives an RF mixer its frequency components as the Fourier transform of a square wave is made up of a series of harmonic elements reconstructing that waveform. Among these Fourier components are the desired sum and difference as well as a host of other undesirables known as intermodulation ("IM") products.

A great deal of innovation, complexity and cost is dedicated to suppressing those IM products through various diode balancing circuit techniques and filters. Typically in RF applications the difference between RF and local oscillator ("LO") produced by the mixers is used as the intermediate frequency ("IF") at which information extraction takes place at manageable frequencies. If a RF modulator were available, however, it may not be as useful as an RF mixer in non-typical applications because acoustic wave frequencies, in AOM materials at least, tend not to exceed several gigahertz in current practice. Thus reaching a 60 MHz or even 500 MHz IF from, say 35 GHz, is far outside the reach of today's performance.

One area in which these issues are important is RADAR ("radio detection and ranging"). In World War II, the British developed and utilized systems for remotely sensing the relative position of incoming planes of the German Luftwaffe. RADAR uses radio frequency ("RF") electromagnetic waves to detect and locate objects at great distances even in bad weather or in total darkness. More particularly, a RADAR system broadcasts RF waves into a field of view, and objects in the field of view reflect the RF waves back to the RADAR system. The characteristics of the reflected waves (i.e., amplitude, phase, etc.) can then be interpreted to determine the position and velocity of the object that reflected the RF wave.

Typical RADAR designs fielded today are composed of subsystems which, but for a few exceptions are, on their own, not necessarily expensive. As integrated units in a single radar system, total cost multiplies due to difficulties in producibility, i.e., the ability to reliably manufacture the system to meet performance specifications. Subsystem and system level yields are low enough due to parts failure, handling or integration followed by test and retest, that final per system costs far exceed the summation of subsystems.

Several efforts attempting to gauge parts count and cost under conventional radar design paradigms with the intent to simplify the device through a reduction in parts have been undertaken. Reducing parts count obviously reduces cost. But, more importantly, parts reduction enhances producibility through the potential for miniaturization or microwave/millimeter wave integrated circuit ("MIMIC") designs that may occupy a single board thus reducing integration and test associated with fewer subsystems.

Conventional designs, however, have proved marginal in several ways. The number of parts remains generally unchanged regardless of organization, inhibiting (though not precluding) efforts to fit everything on a single board. Variation in circuit organization raises concerns for performance, notably diode mixer intermodulation products of multiple input RF tones on a single channel with their capacity to blind the receiver to what is target signal and what are simply byproducts of the mixing process. Unfortunately, regardless of circuit layout, conventional design efforts resulted in conventional problems with no significant breakthrough in parts reduction.

The present invention is directed to resolving, or at least reducing, one or all of the problems mentioned above.

SUMMARY OF THE INVENTION

The invention, in its various aspects and embodiments, includes an acousto-radio frequency modulator and an apparatus employing the same. The acousto-radio frequency modulator comprises a radiowave waveguide including a first end defining an input and a second end defining an output; an acousto-radio material positioned in the signal path of the radiowave waveguide; and a acoustic source coupled to the acousto-radio material and capable of driving an acoustic signal through the acousto-radio material. The apparatus comprises a plurality of ARFMs, each capable of modulating a component of a received RADAR signal received by the antenna; a frequency combiner capable of frequency multiplexing each of the components into a combined signal; a filter capable of filtering the combined signal; an amplifier capable of amplifying the filtered signal; and an analog to digital converter capable of converting the amplified signal to a digital representation.

BRIEF DESCRIPTION OF THE DRAWINGS

The invention may be understood by reference to the following description taken in conjunction with the accompanying drawings, in which like reference numerals identify like elements, and in which:

FIG. 16 illustrates a first RADAR receiver employing ARFMs in accordance with another aspect of the present invention;

FIG. 17 depicts one particular embodiment of a RADAR transceiver mounted on an airborne platform in accordance with one particular aspect of the present invention;

FIG. 18 depicts one particular embodiment of a direct video RADAR ("DVR") receiver; and FIG. 19 depicts a RADAR transceiver incorporating the RADAR DVR of FIG. 18.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1A:
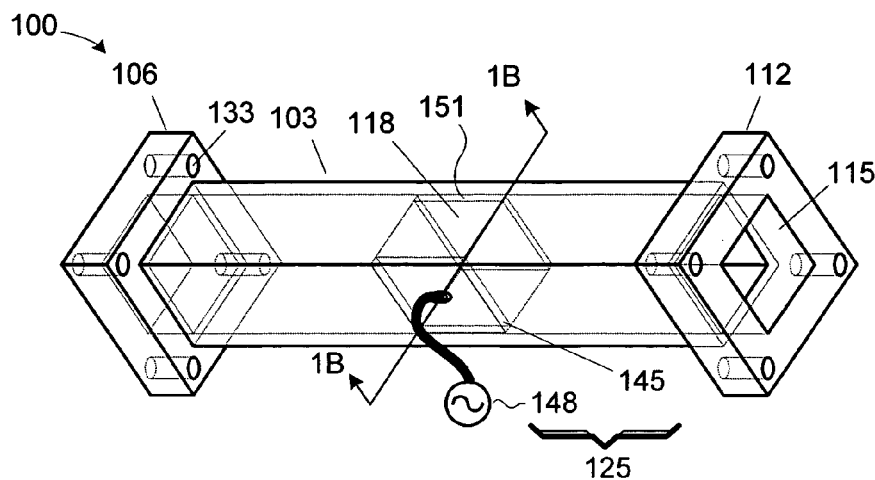
FIG. 1A-FIG. 1B illustrate a single-stage, straight ARFM in accordance with a first embodiment of the present invention in a perspective view and a plan, cross-section view, respectively, the section of FIG. 1B being taken along line 1B-1B in FIG. 1A, in accordance with a first aspect of the present invention.
Figure 1B:
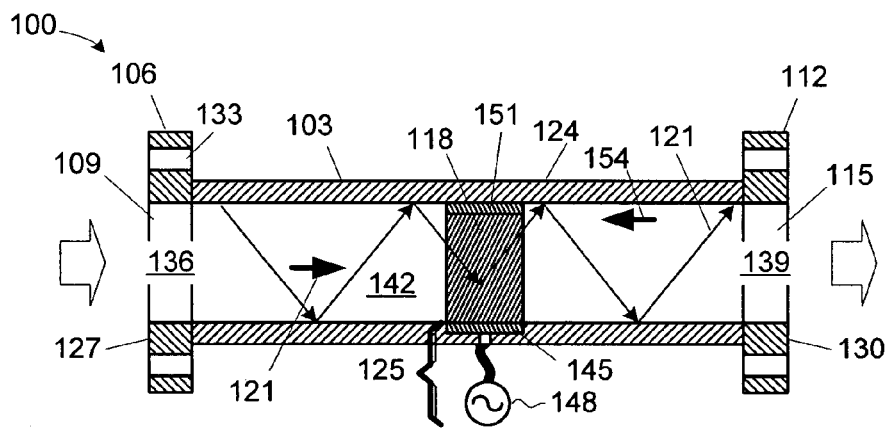

FIG. 1A-FIG. 1B illustrate a single-stage, straight ARFM 100 in accordance with a first embodiment of the present invention in an perspective view and a plan, cross-section view, respectively, the section of FIG. 1B being taken along line 1B-1B in FIG. 1A. The straight, single-stage ARFM 100 of FIG. 1A-FIG. 1B comprises a radiowave waveguide 103 including a first end 106 defining an input 109 and a second end 112 defining an output 115. An acousto-radio material 118 is positioned in the signal path, represented by the arrows 121, shown in FIG. 1B, of the waveguide 103. An acoustic source 125, also shown in FIG. 1B, is coupled to the acousto-radio material 118 and capable of driving an acoustic signal through the acousto-radio material 118. The illustrated embodiment also includes an acoustic absorber 151 that absorbs portions of the acoustic signals reflected back to the acousto-radio material 118.

More particularly, the waveguide 103 is an example of but one means for guiding a radiowave suitable for use in accordance with the present invention. The waveguide 103 comprises an elongated conduit 124 and two waveguide flanges 127, 130. The conduit 124 and waveguide flanges 127, 130 may be fabricated from any material commonly known to be suitable for the construction of electromagnetic waveguides. Exemplary materials include, but are not limited to, materials such as copper, brass, aluminum, and various alloys thereof. The waveguide flanges 127, 130 define a plurality of threaded openings 133 (only one indicated) by which the ARFM 100 may be affixed to other RF components (not shown). The waveguide flange 127 defines an aperture 136, the endplate 130 defines an aperture 139, and the conduit defines a passage 142. The aperture 136, aperture 139, and passage 142 define the signal path 121, for which the aperture 136 is the input 109 and the aperture 139 is the output 115. Note that the waveguide 103 may take other forms in alternative embodiments. For instance, the waveguide 103 may be implemented as a microwave channel in an integrated circuit (not shown) mounted on a printed circuit board (not shown) or a coaxial cable (not shown).

The acousto-radio material 118 is, by way of example and illustration, one means for acousto-radio modulating the frequency of the radiowave. The acousto-radio material 118 may be any material that allows transmittance of and interaction of both radiowaves and acoustic waves which are composed of compression and rarefraction zones corresponding to periodic, repeating variations in index of refraction. Such materials are known and are commercially available. Studies have shown that materials such as Lithium Niobate ($LiNbO_3$) and Tellurium Dioxide ($TeO_2$) are suitable for implementing the present invention. However, other materials may also prove acceptable, occupying the same acousto-radio footprint as is shown.

Still referring to FIG. 1B, the ARFM 100 includes means for driving an acoustic signal through the acousto-radio material 118, e.g., the acoustic source 125. The acoustic source 125 of the embodiments illustrated herein comprises a piezo-transducer 145 driven by an oscillator 148. However, in alternative embodiments, the acoustic source 125 may instead be a voltage controlled oscillator (not shown) or a crystal oscillator (not shown). The acoustic source 125 is physically coupled to the acousto-radio material 118 such that acoustic signals (not shown) generated by the acoustic source 125 propagate through the acousto-radio material 118. The piezoelectric transducer 145 is in direct physical contact with the acousto-radio material 118. In the illustrated embodiment, this direct physical contact is facilitated and maintained by bonding, adhering, or otherwise affixing the piezoelectric transducer 145 to the acousto-radio material 118.

Figures 2A, 2B:
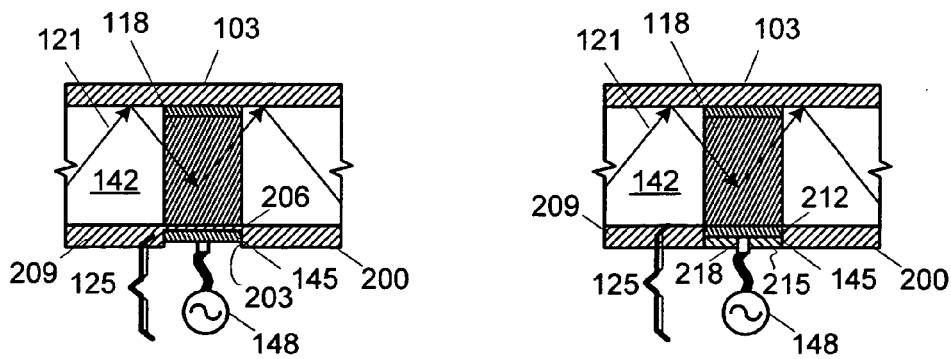
FIG. 2A-FIG. 2B depict alternative physical coupling between the acoustic source and the acousto-radio material of the ARFM of FIG. 1A-FIG. 1B.

Note that the physical coupling does not necessarily require direct contact between acoustic source 125 and the acousto-radio material 118. For instance, as shown in FIG. 2A, the piezoelectric transducer 145 may be disposed on the exterior 200 of the waveguide 103 in a recess 203. The recess 203 is fabricated deep enough to create a sufficiently thin portion 206 of the wall 209 of the waveguide 103 that acoustic signals generated by the acoustic source 125 can still be driven into the acousto-radio material 118. How thin the portion 206 is fabricated will be implementation specific depending on the materials of construction for the waveguide 103 and the strength of the acoustic source 125. In this particular embodiment, the piezoelectric transducer 145 is bonded, adhered, or otherwise affixed to the portion 206 of the wall 209 in the recess 203.

Alternatively, as is shown in FIG. 2B, an aperture 212 is formed in the wall 209. The acousto-radio material 118 and the acoustic source 125 are positioned in the signal path 121 through the aperture 212 and the aperture 212 plugged by a cap 215. The cap 215 is fabricated from an electrically conductive material and, preferably, the same material from which the waveguide 103 is fabricated. The local oscillator 148 is electrically connected to the piezoelectric transducer 145 through an opening 218 in the cap 215. Still other arrangements may be employed in still other alternative embodiments.

Returning to FIG. 1B, the ARFM 100 also includes an acoustic absorber 151. The acoustic absorber 151 is bonded, adhered, or otherwise affixed to the acousto-radio material 118 and is also positioned in the signal path 121.

Figure 3:
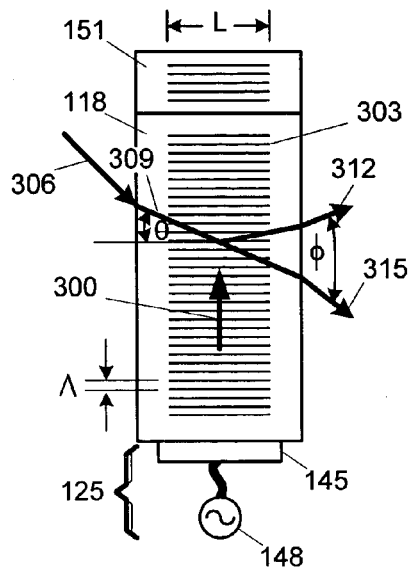
FIG. 3 illustrates the principle of operation for the ARFM of FIG. 1.

FIG. 3 illustrates the principles of operation for the ARFM 100 in FIG. 1A-FIG. 1B and, more technically, "contradirectional" scattering in an isotropic medium. The acoustic source 125 generates an acoustic signal, represented by the arrow 300, and drives it through the acousto-radio material 118. In the illustrated embodiment, the acoustic wave 300 is produced by the piezoelectric transducer 145, that is or includes a crystal that exhibits a slight change in physical size when voltage is applied by the local oscillator 148. When the piezoelectric transducer 145 is placed in contact with the acousto-radio material 118 and an oscillating voltage is applied, the crystal expands and contracts as the voltage varies. This, in turn, exerts pressure on the acousto-radio material 118, launching the acoustic wave 300 through it.

As the acoustic wave 300 travels through a acousto-radio material 118, it produces periodic variations in the index of refraction represented by the hatchings 303 (only, one indicated). The acoustic wave 300 can be considered as a series of compressions and rarefactions moving through the acousto-radio material 118. In regions where the acoustic pressure is high, the acousto-radio material 118 is slightly compressed yielding an increase in index of refraction (higher density). The increase is small, but can produce large cumulative effects on a radio wave passing some distance through the acousto-radio material 118, as will be discussed more fully below.

With each acoustic wave variation in material density (and the associated variation in index of refraction), a reflection and transmission occurs for an incident radio wave 306 passing through the acousto-radio material 118 just as at any index-differing interface. That portion of the wavefront which continues on as the transmitted component 309 also travels slightly further though the acousto-radio material 118 acquiring a phase change with respect to its neighboring rays. When that the transmitted component 309 meets the next index variation 303 at the next acoustic wave maxima, once again a reflection and transmission occurs. This reflection and transmission generates a deflected wave 312 and an undeflected wave 315.

There is an accumulation of periodic, and repeating, phase adjustments that eventually emerge as local elemental emitters of the same frequency but differing phases from place to place across the material surface. These alternate compressions and rarefactions associated with the acoustic wave form a transmission grating that diffracts passing light like any diffraction grating. As far as impinging light waves are concerned the acoustic wave stands still, hence a stationary grating effect. No light is deflected unless the acoustic wave is present.

This repetitive radio/acoustic wave interaction through the acousto-radio material 118 described above results in an accumulation of phase differing waves that interfere with each other. This makes the amplitude of the diffracted wave a function of the radio-frequency power applied to the piezoelectric transducer 145 by the local oscillator 148. That is, power to the piezoelectric transducer 145 controls deflected radio wave intensity because there becomes a stronger compression within the acousto-radio material 118 and hence a greater index change off of which a reflection takes place. Since the angle of deflection is dependent upon the input signal wavelength to the piezoelectric transducer, different acoustic wavelengths will diffract at different angles. This allows the ARFM to be used as a tunable filter in which jammers at frequencies other than our transmit frequency might be filtered based on their angle separation from our carrier.

More technically, in FIG. 3, L is defined as the interaction length—between radio wave 309 and the acoustic signal 300. Like any wave phenomenon, the relation between wavelength and velocity (in the acousto-radio material 118) is given by:

$$V = \Lambda F \qquad \text{Eq. (1)}$$

where V is velocity of propagation of acoustic in the acousto-radio material 118 and $\Lambda$ is its wavelength. Variation of the piezo-drive frequency of the local oscillator 148 sets acoustic wavelength, $\Lambda$.

FIG. 3 also defines what is called the ("small") Bragg angle $\theta$, as is seen in X-ray diffraction off parallel periodic atomic sheets in a crystal but in our case the parallel planes are acoustic wave induced index variations. The acoustic wavelength (or grating spacing) is a function of the piezo-drive where the acoustic wavelength also controls the angle of deflection. $\theta$ is given by:

$$\theta = \lambda / 2\Lambda \qquad \text{Eq. (2)}$$

where again $\lambda$ is the light wavelength in the material or $\lambda/n$, n being the index of refraction. The Bragg angle gives that angle at which the most efficient reflection occurs. The exit $1^{st}$ order beam is angularly removed from the $0^{th}$ order by $2\theta$ or $\phi$ in the drawing.

Figure 4:
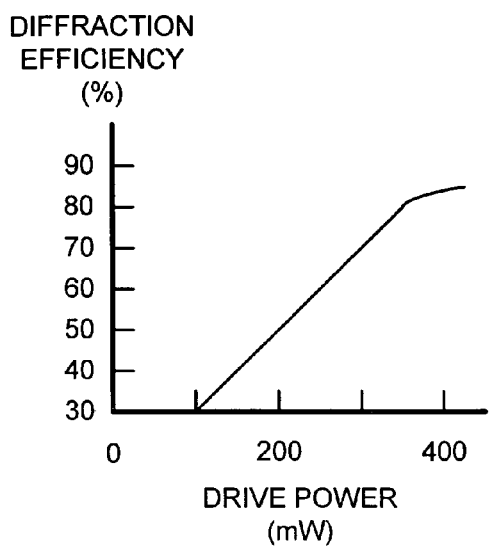
FIG. 4 graphs the drive power of the acoustic source as a function of the diffraction efficiency of the acousto-radio material.

FIG. 4 shows how drive power affects the performance of the ARFM 100, delineating diffraction efficiency—i.e., what percentage of input power goes into the diffracted wave as a function of drive power. Diffraction efficiency increases with drive power, then saturates at a value near 100%. An ARFM will typically achieve 1st order wave powers 85%-95% of the incident wave power, with little remaining for the 0th order. This means that almost all incident radio wave energy enters the diffracted wave. For the example shown, it takes a few hundred milliwatts to reach high values of diffraction efficiency. For other devices, it may take several watts.

Returning to FIG. 3, the incident radio wave 306 is Doppler shifted by the acoustic wave and picks up the frequency of the acoustic signal 300. The time rate of change of the motion between the incident radio wave 306 and the acoustic signal 300, though apparently zero for an individual photon, is non-zero over time for many photons and the derivative of this phase change resulting over time is frequency. The result is that a 1st order exit beam is composed of the light frequency plus or minus the acoustic wave frequency, depending on whether our radio wave is inserted toward or away from the acoustic wave. There is no sum and difference. There are no intermodulation products.

Returning to the ARFM 100 in FIG. 1A-FIG. 1B, the illustrated embodiment is intended for use in Radio Detection and Ranging ("RADAR") sets, although the invention is not so limited. Thus, given size and weight concerns for such an application, higher transducer drive frequencies are desirable to reduce the size of piezoelectric transducers 145. On the other hand, low analog-to-digital ("A/D") conversion speeds are desirable for reduced cost in radar applications and it is the frequency of the piezoelectric transducers 145 as imparted to the radio wave that will eventually be sampled. Initially choosing drive frequencies of 1-5 MHz, the rule of transducer length equal to one-half of the desired wavelength in the medium yields (for quartz, 3850 m/s with Y-cut crystal, "sheer-transmission") 1.9 mm-0.4 mm thickness for the crystal of the piezoelectric transducers 145. Note that sheer transmission results in lower sound speeds but some materials display anisotropic refraction index behavior so care is warranted.

With respect to the acousto-radio material 118, consider a crystalline material with an index of refraction, n=2.0 at 35 GHz, velocity of sound in the longitudinal atomic axis of 4000 m/s, density of 6 grams/cm$^3$ or 6000 kg/m$^3$, figure of merit $M_2$ of 35×10$^{-18}$. To operate in the Bragg region requires the interaction length "L" of the medium satisfy L>$\Lambda^2/\lambda$, which any practical design at our chosen wavelength is far in excess of; for example, L=0.09 mm. From Eq. (1), $\Lambda$=0.004-0.0008. From Eq. (2), $\theta=\lambda/2\Lambda$, where $\Lambda$ is that of 35 GHz in the acoustic medium, or $\lambda/n=\lambda/2.0$=4.29 e-3 m. We first examine sound wavelength vs. drive frequency. With respect to the acousto-radio material 118, consider a crystalline material with an index of refraction, n=2.0 at 35 GHz, velocity of sound in the longitudinal atomic axis of 4000 m/s. To operate in the Bragg region requires the interaction length "L" of the medium satisfy L>$\Lambda^2/\lambda$, which any practical design at our chosen wavelength is far in excess of. For a 2 MHz piezoelectric drive frequency L must be greater than 0.9 mm.

Figure 5:
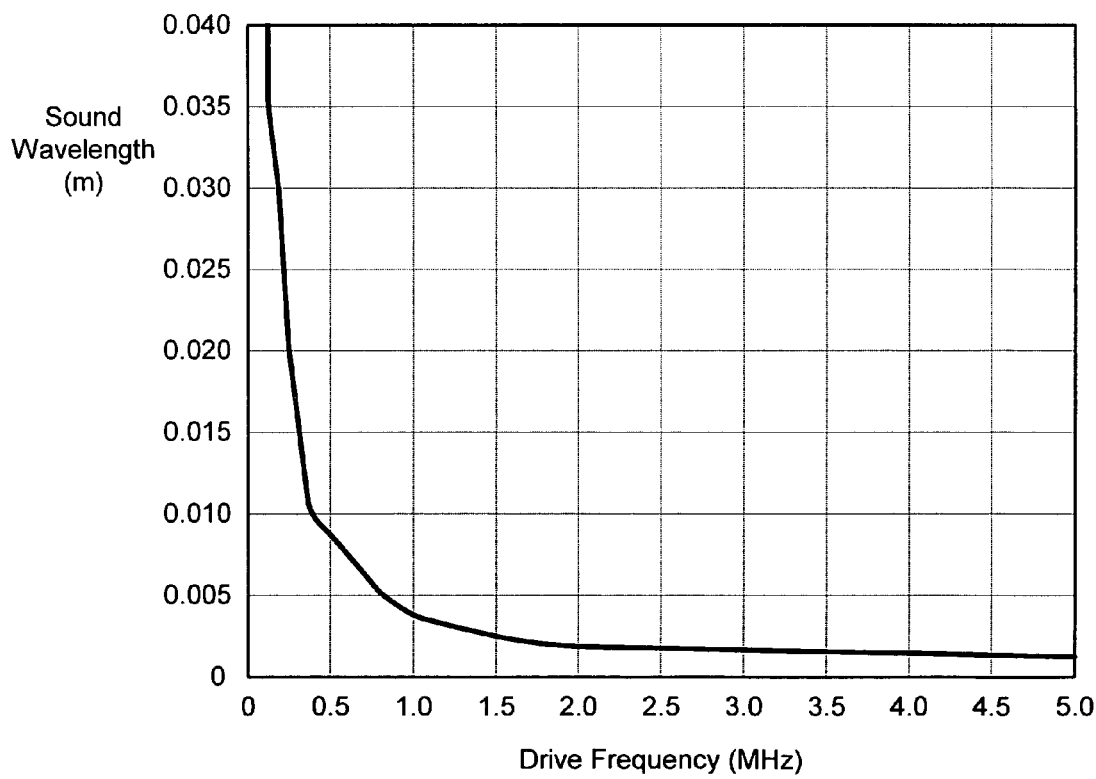
FIG. 5 graphs the acoustic wavelength of the output signal as a function of the frequency of the drive for the acoustic source.

First, consider the sound wavelength vs. drive frequency. FIG. 5 is revealing in that it is bounding the physical size of our acoustic medium in terms of distance over which sound waves travel coupled with the notion that enough sound wave fronts should be met over the interaction length to accumulate a sizable interaction. (Similarly our transducer thickness can be gained by the same method.) For example a 100 KHz drive yields a sound wavelength of ~3.5 cm, requiring a large device carrying many wavelengths.

Figure 6:
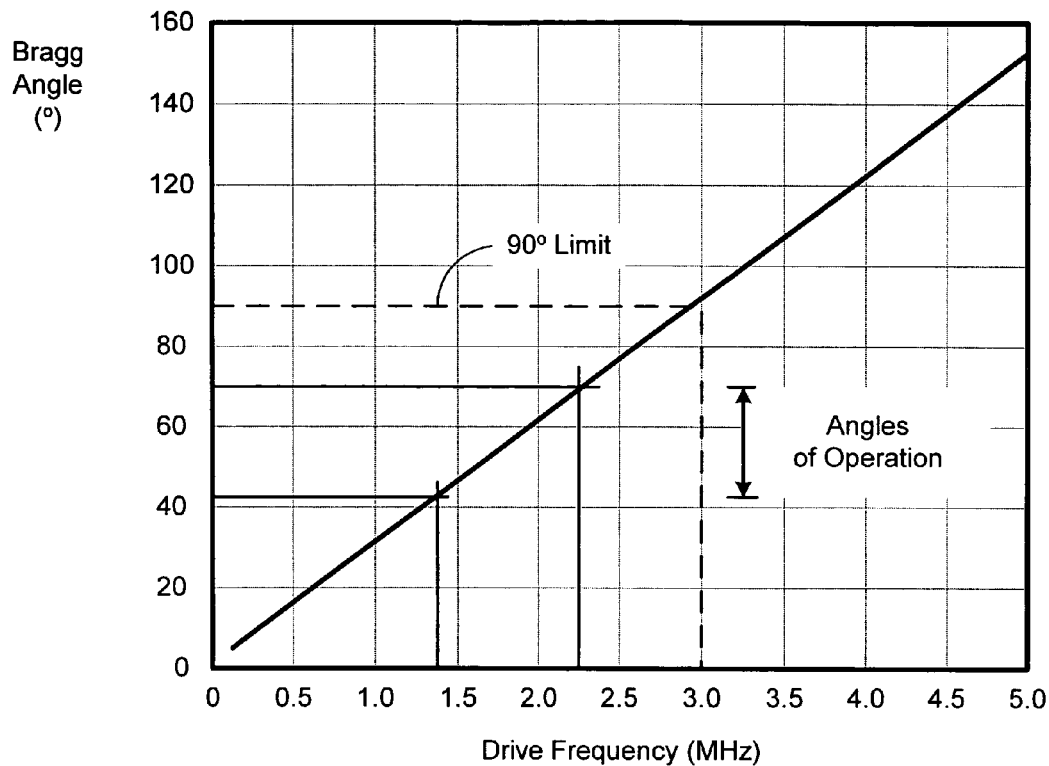
FIG. 6 graphs the Bragg angle of the incident input signal as a function of drive frequency.

Next consider Bragg angle over frequency, shown in FIG. 6. To get the most efficient transfer of shifted frequency waveform into the 1st order beam coming out of the acoustic material we want our 35 GHz signal to enter at the Bragg angle. By FIG. 6 the exit angle of our radio wave changes with piezoelectric drive frequency, which for our desires will be fixed (though offset for separate channels).

In keeping with grating theory, as the grating spacing becomes smaller compared to an impinging wavelength (and recall the grating here is made up of sound wave fronts) then the 1$^{st}$ order moves ever further away from the 0$^{th}$ order. For radio waves, we see angles of 60° at ~2 MHz drive. For ARFM designs that use some other kind of waveguide, such as a coaxial cable, microwave/millimeter wave integrated circuit ("MIMIC") or microstrip, this is a matter of importance.

Note that the drive frequency is limited to less than 3 MHz, as shown by the dotted line, since the ARFM 100 cannot emit beyond 90° (i.e., along the exit surface). This also determines the oscillator choice, where miniature voltage controlled oscillators ("VCOs") are commonly found above 15 MHz, but rarely less. As it is, the RADAR applications for the illustrated embodiment is not interested in variable frequencies coming from VCOs, but instead a fixed, single frequency, for which small crystal oscillators in the 500 KHz-2 MHz region are common. This also sets the range over which the A/D conversion operates, given the exemplary parameters, a slow, low cost ADC will be adequate.

Figure 7:
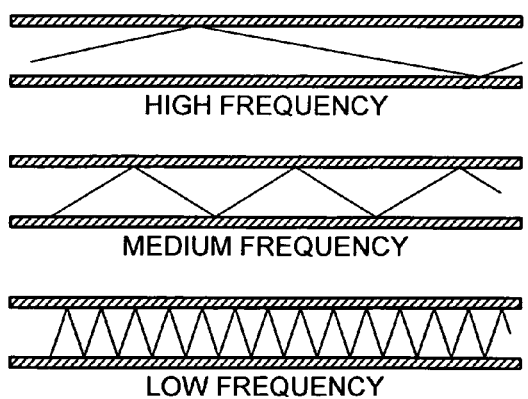
FIG. 7 graphs the variation in waveguide incidence angle as a function of the frequency of the incident input signal in a waveguide.
Figure 8:
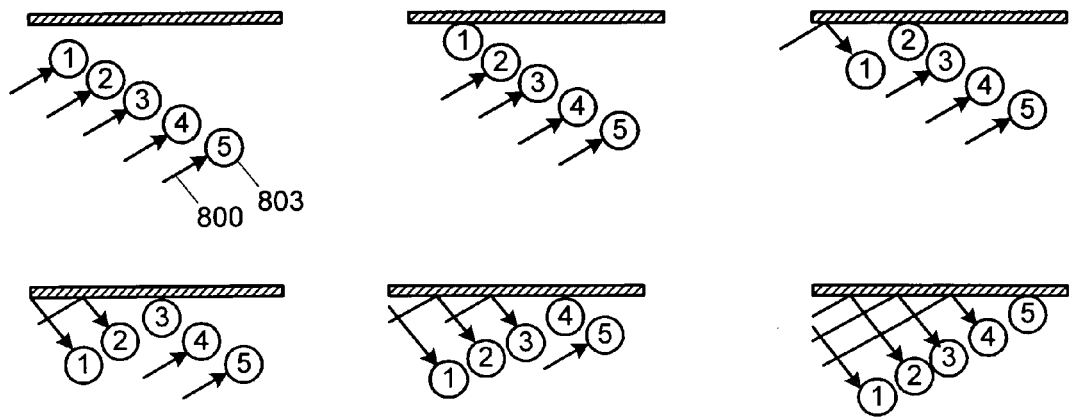
FIG. 8 illustrates the interaction between the wavefront of the input signal with the waveguide.

The illustrated embodiment takes advantage of characteristic angles at which RF "bounces" down the interior 142 of the waveguide 103. The group velocity of energy in a waveguide is set by the reflection angle of wavefronts off its walls and the reflection angle is set by frequency of the input energy, as is shown in FIG. 7. As frequency is decreased the reflection angle increases, causing group velocity to decrease. The waveguide 103 will set incident and reflection angles on its own. Knowing where they reside for a particular frequency allows placement of acousto-radio material 118 within the waveguide 103 at the proper location to satisfy Bragg requirements or requires adjusting frequency to achieve those angles accordingly. The RF wavefront behaves as is conceptually shown in FIG. 8, where each ray 800 (only one indicated) is proceeded by a photon (only one indicated). The result is a plane wave throughout, at a deterministic incident/reflection angle, but always planar.

Amplitude through the ARFM 100 will be reduced by reflections at the acoustic material interfaces, amounting to impedance mismatch, and 0$^{th}$ order loss. Amplitude reduction will also result from, e.g., waveguide boundaries at the interface between the piezoelectric transducer 145 and the cap 215 in the embodiment of FIG. 2B. The last loss component can be eliminated if a manufacturing by thinning the wall 209 of the waveguide 103 is enough to communicate the piezoelectric drive 145 while still maintaining integrity of the waveguide inner surface, or by some other suitable means, as in the embodiment of FIG. 2A. In that case a means of inserting the acoustic medium becomes a bigger challenge. Since the zeroth order at efficient Bragg angles should contain 15% or less of total signal for maximum piezoelectric drive amplitudes, majority loss resides in impedance mismatched between air-filled waveguide and acoustic medium.

Figure 9:
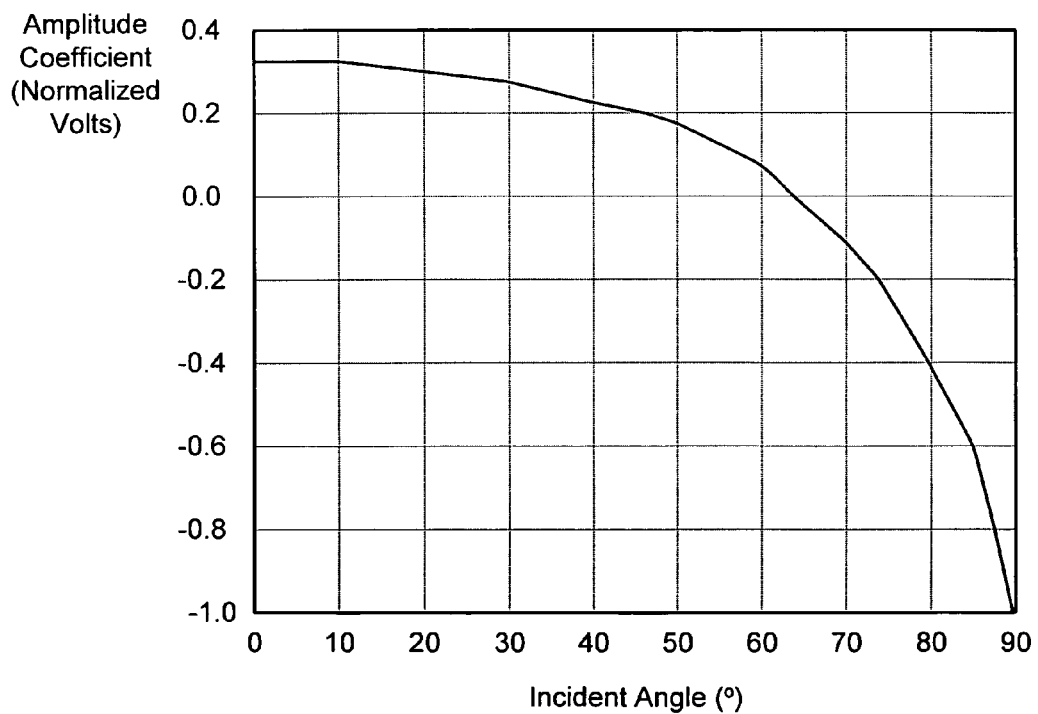
FIG. 9 illustrates the Fresnel transmission curve for the acousto-radio material, where the material index of refraction, $n_r$, is greater than the index of refraction of the surrounding medium, $n_i$.

For standard $TE_{10}$ mode waveguide transmission yielding parallel polarization incident on the medium, loss is a matter of reflection R at the interface (where absorption considered insignificant):

$$R = \tan(\theta_i - \theta_t)/\tan(\theta_i + \theta_t) \qquad \text{Eq. (3)}$$

where θi is the angle of incidence upon the medium and θt is the angle of transmission through the medium. FIG. 9 shows the standard Fresnel reflection curve where the index of refraction, $n_t$, of the acoustic medium is higher than surrounding air, $n_i$. This represents loss at our first interface. (Change in sign of voltage amplitude in FIG. 9 represents a phase flip at the acoustic surface and is irrelevant to present concerns.)

Figure 10:
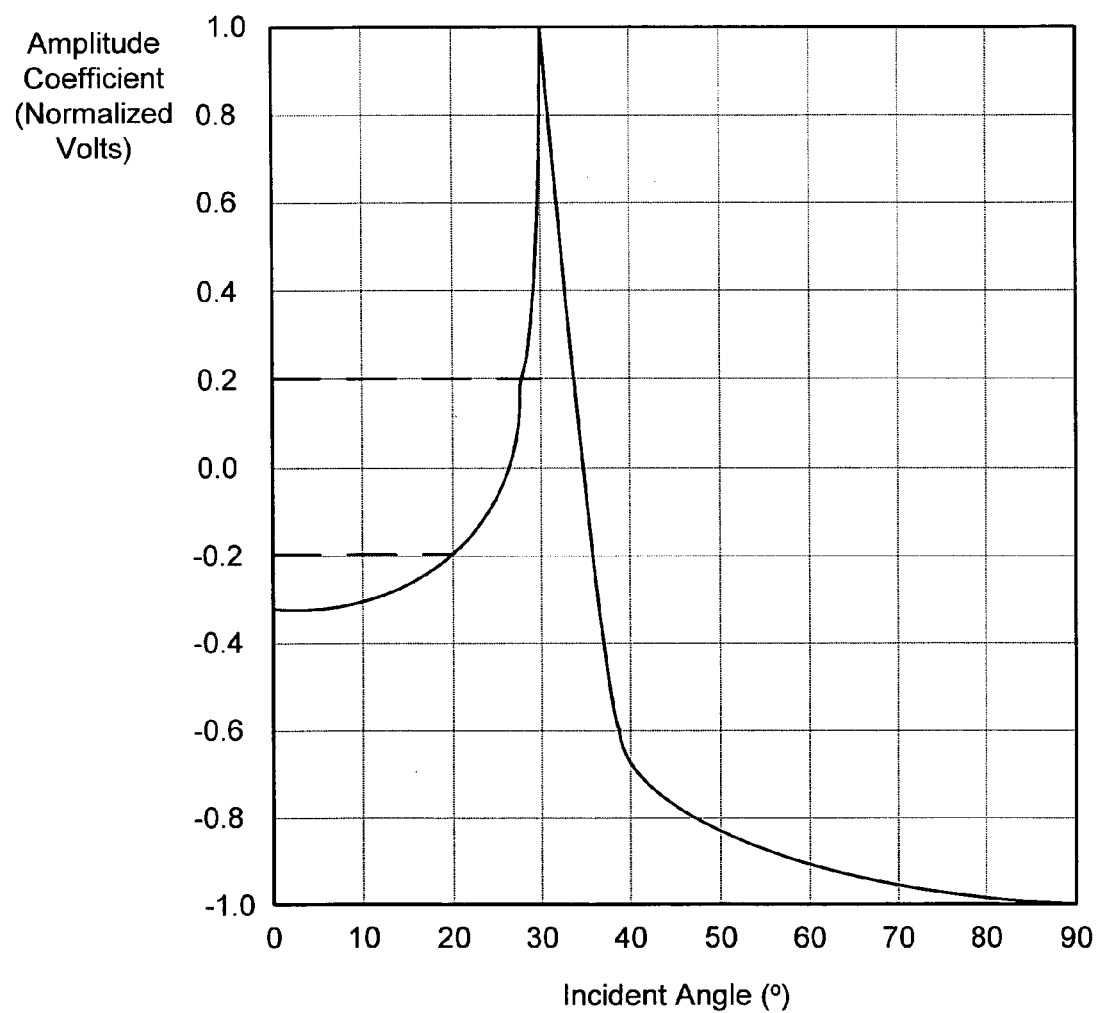
FIG. 10 illustrates the Fresnel reflection curve for $n_i > n_r$, where $n_o$ $n_i$ is now the index of refraction of the acousto-radio material and nt is the index of refraction of the surrounding medium.

FIG. 10 shows the same process taking place from the inside of our acoustic medium. (Again there is a phase reversal at what is called the polarization angle, hence our sign change, also of no concern.) The apparent amplitude reduction after 30° is an artifact of imaginary components present in the equation while in reality the amplitude remains 1 after 30°, which happens to be exactly the so called critical angle defined by $\sin \theta_c = n_r/n_i$ where $n_i > n_r$, and $\theta_c = 30°$ for $n_r = 2$. At and after the critical angle the incident beam suffers total internal reflection, a condition to avoid.

Figure 11:
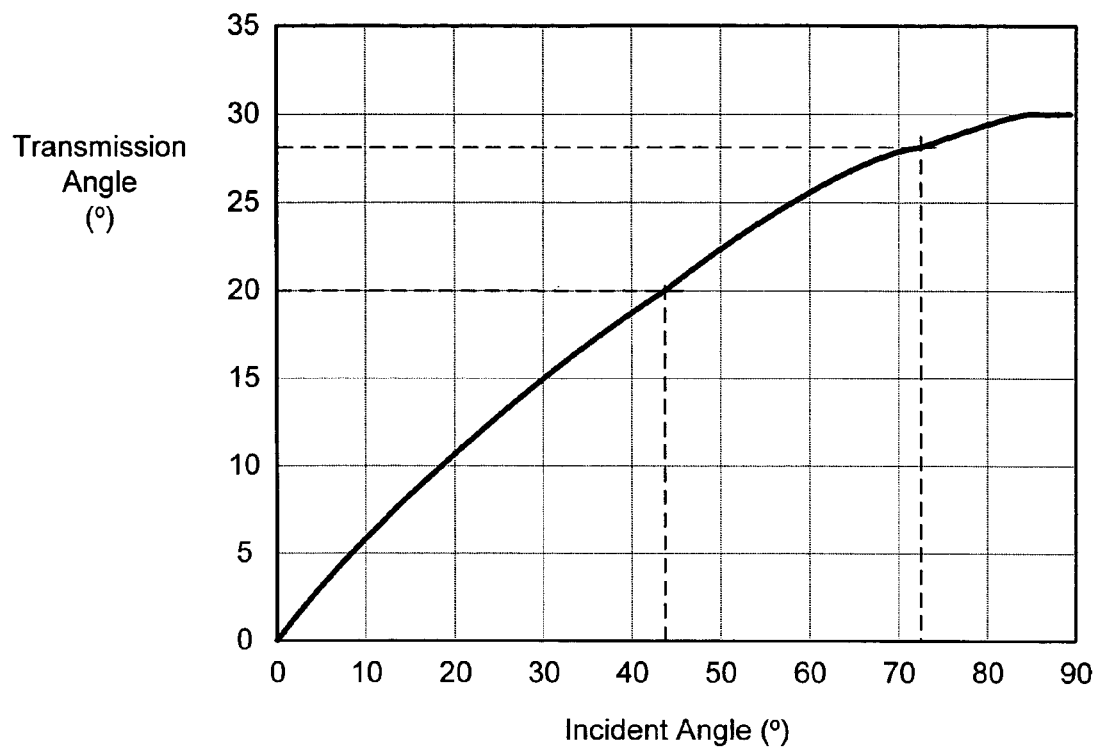
FIG. 11 graphs the transmission angle as a function of the incident angle for the acousto-radio material.

Once again we have limits set on allowable angles that flow back to the piezo drive frequency. We are driven to shallow internal-material incident angles, or in other words, shallow transmission angles from the standpoint of external incidence. FIG. 11 provides an indication of where we have acceptable incident angles by matching transmission angles found in FIG. 10 based on their associated losses to incident angles upon the medium (which are also meant to satisfy Bragg) found in FIG. 9. It returns us to acceptable drive frequencies of FIG. 6. We find preferable drives of 1.4 MHz-2.3 MHz for the material properties chosen.

Thus, if the drive frequency of the piezoelectric transducer 145 is pushed too high—even though it may be valid for Bragg angle operation—the radio wave signal will eventually totally internally reflect so that there is no output. If the drive frequency is pulled too low, the radio wave signal will suffer unnecessary (though small) losses to the second interface reflection. Given reflection losses at both interfaces for given angles and a potential $0^{th}$ order loss, an insertion loss of about 3 dB may be expected. Of that, about 0.4 of the amplitude is reflection loss for a voltage standing wave ratio ("VSWR") or 2.33:1. Note also that the ARFM 100 has the capacity to reduce $1^{st}$ order beam power by reducing the amplitudes of the drive of the piezoelectric transducer 145, i.e., the local oscillator 148. This passes off more to the $0^{th}$ order unshifted beam.

With respect to frequency output, entrance RF photons have an energy of hf, where h is Plank's constant and f is frequency of our photon in the wave domain. Likewise, sound waves, as phonons, have an energy of hv, where v is the phonon frequency in the sound wave domain. The interaction of light and sound involves the collision of these two particles resulting in their annihilation and simultaneous creation of a new (diffracted) photon at a new frequency $f_n$, where $f_n = f + v$. Exactly one photon is created, not two. And the frequency is exactly as stated. There are no other sum/difference/modulation products. This does not mean, however, that there will be no frequency spreading. For Bragg diffraction, there will be one order and ideally this will be of but one frequency, where that assumes the incident beam strikes at one angle with respect to sound fronts.

Note that the potential for a beat frequency exists between the unshifted $0^{th}$ order signal and the frequency shifted $1^{st}$ order signal within the ARFM waveguide after the input signal passes through the acousto-radio material. The amplitude of the beat is dependent upon the relative amplitude of both signals. So for efficient frequency translation that magnitude will be small. More importantly since the beat is the difference of the two frequencies, the result is simply the same frequency as the 1st order signal is shifted by the ARFM. The combiner following our ARFM has a characteristic bandpass that will not pass such low frequency components. Hence beats between the two should be filtered out In reality any beam has some divergence and this, from the wave nature perspective, changes the component of Doppler measured based on the sound wave speed vector component in the light wave direction. RF collimation is a challenge because that collimation is diffraction limited by the aperture used. That limitation is a function of λ/D where λ is the transmit frequency and D the aperture. Clearly either small wavelengths or large apertures yield tight beams and narrower Doppler spread on the $1^{st}$ order. But the ARFM 100 contains the RF signal within the waveguide 103 and, as addressed above, plane wave transmission is maintained throughout. Beam spreading, which would vary incidence angle across the sound wave front, should therefore not be a concern.

Figure 12:
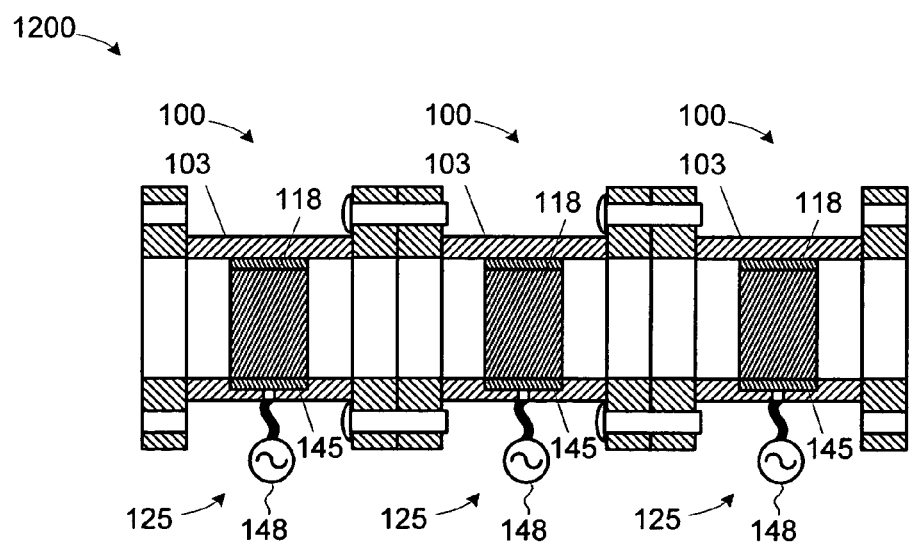
FIG. 12 depicts a straight, multi-stage ARFM in accordance with a second embodiment of the present invention.

The ARFM 100 may be combined with others of the same design in series allowing successive ARFMs 100 to intercept and additionally frequency shift their input. FIG. 12 illustrates a straight, multi-staged ARFM 1200 comprising three ARFMs 100 fastened together in just such an arrangement. Note that each acoustic source 125 has its own, independent local oscillator 128 for its respective piezoelectric transducer 145, although they may be powered by a common local oscillator 128 in some embodiments. The impetus for such a system comes from a desire to reach high X to Ka-band frequency shifts thus stepping the input RF signal to the IF in one device.

Figure 13A:
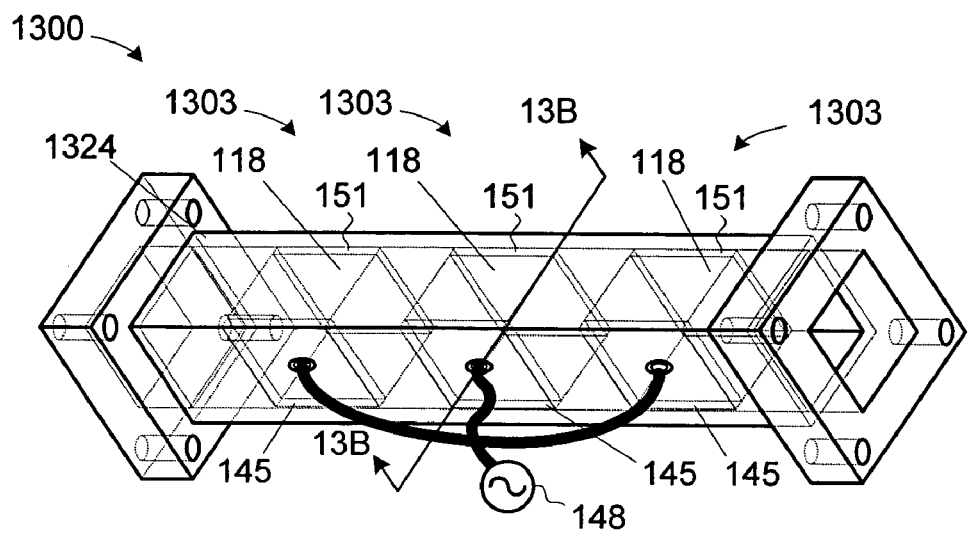
FIG. 13A-FIG. 13B illustrate a multi-stage, straight ARFM in accordance with a third embodiment of the present invention in an perspective view and a plan, cross-section view, respectively, the section of FIG. 13B being taken along line 13B-13B in FIG. 13A.
Figure 13B:
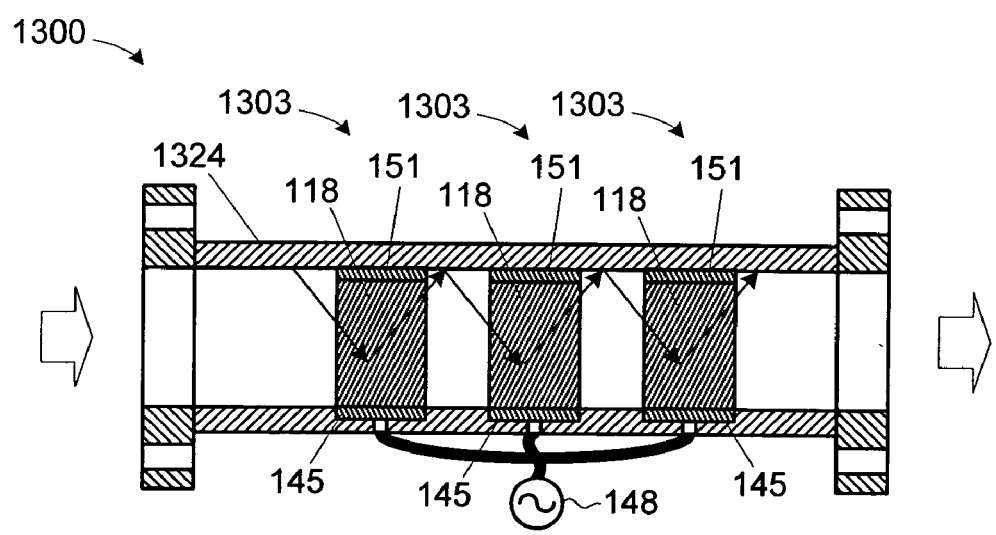

A more desirable unit would make that frequency step without series stacking of individual devices and the loss they incur. One such multi-stage ARFM 1300 is illustrated in FIG. 13A-FIG. 13B. FIG. 13A-FIG. 13B illustrate a multi-stage, straight ARFM 1300 in accordance with a third embodiment of the present invention in an perspective view and a plan, cross-section view, respectively, the section of FIG. 13B being taken along line 13B-13B in FIG. 13A. The ARFM 1300 is generally similar in design and construction relative to the ARFM 100 in FIG. 1. However, the elongate conduit 1324 will typically be longer than the elongate conduit 124 of the ARFM 100 to accommodate the multiple stages. As the term "multi-stage" implies, the ARFM 1300 includes multiple stages 1303. The ARFM 1300 includes three stages 1303, but the number of stages 1303 is not material to the practice of the invention, although it may be important in meeting the particular design constraints of a given implementation. Each of the stages 1303 includes an acousto-radio material 118, an acoustic absorber 151, and a piezoelectric transducer 145. All of the piezoelectric transducers are driven by a common local oscillator 148, although alternative embodiments may drive the piezoelectric transducers 145 with separate local oscillators 148.

Figure 14A:
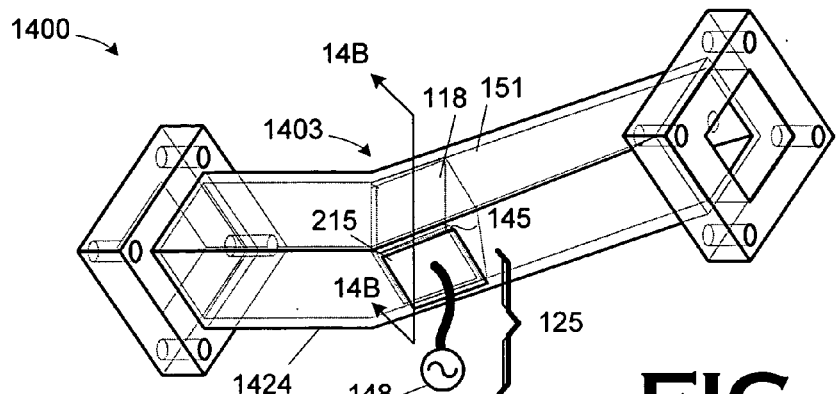
FIG. 14A-FIG. 14B illustrate a multi-stage, bent ARFM in accordance with a third embodiment of the present invention in an perspective view and a plan, cross-section view, respectively, the section of FIG. 14B being taken along line 14B-14B in FIG. 14A.
Figure 14B:
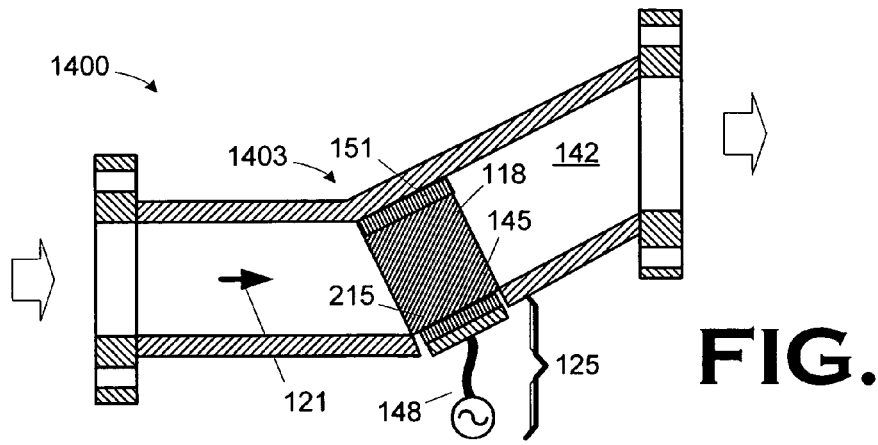

As was noted above, the Bragg angle is a design consideration. In some embodiments, to help achieve a satisfactory Bragg angle, the acousto-radio material 118 may be tilted relative to the signal path 121. FIG. 14A-FIG. 14B illustrate a single-stage, bent ARFM 1400 in accordance with a third embodiment of the present invention in an perspective view and a plan, cross-section view, respectively, the section of FIG. 14B being taken along line 14B-14B in FIG. 14A. In this particular embodiment, the elongate conduit 1424 includes an exit bend 1400. The acousto-radio material 118 is positioned in the passage 142 after the exit bend 1400 and, thus, at an angle relative to the incident signal path 121, shown in FIG. 14B.

Figure 15:
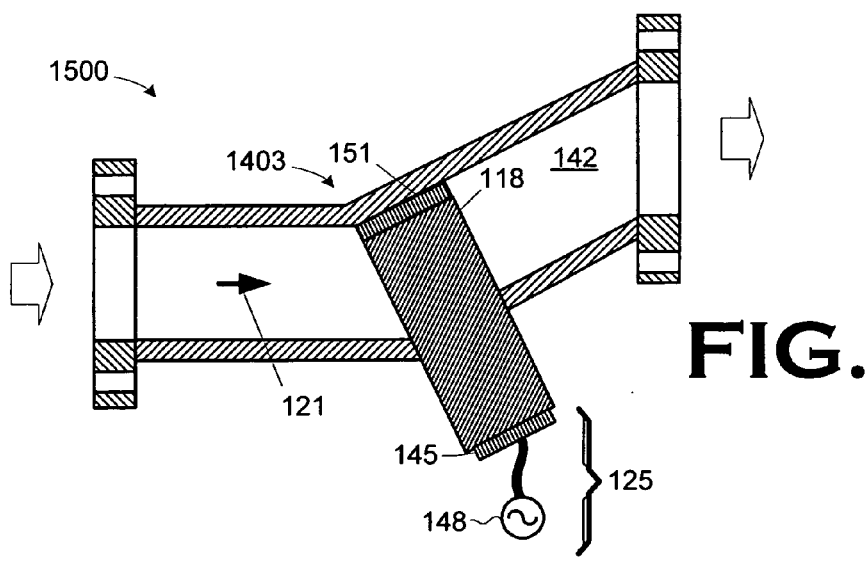
FIG. 15 illustrates a single-stage, bent ARFM in accordance with a fourth embodiment of the present invention.

FIG. 15 illustrates a single-stage, bent ARFM 1500 alternative to that shown in FIG. 14A-FIG. 14B. The waveguide 1503 is formed of two sections 1504, 1505 bonded to the acousto-radio material 118 using any suitable technique known to the art. The ARFM 1500 embodies an intrusive ARFM design, i.e., the acousto-radio material an intrusion to the waveguide 1503. One drawback is that this design effectively creates a transmitting and receiving antenna system either side of the acousto-radio material 118 in the near-field of each antenna with associated loss through that acousto-radio material 118 to the outside world. Consequently, the ARFM 1500 should be protected against RFI by encapsulating the ARFM 1500 in some sort of radiowave absorbing package (not shown).

One application for an ARFM in accordance with the invention is to implement a RADAR receiver. In adaptive radar processing, independent channels from each of four antenna quadrants are taken to a digital processor for computation without the usual sum and AZ/EL delta channels formed by a monopulse feedbridge in standard three channel systems. The channel count may go as high as eight if each antenna quadrant is dual polarized. Approaches focused on independent channels carried as such all the way to the analog-to-digital ("A/D") converters ("ADCs") for digitization or the combination of channels on a frequency multiplexed line in an effort to simplify the design have been examined elsewhere. In the former case, each channel is a repeat of the last thus increasing cost, complexity and threatening producibility desires but reducing potentially risky mixer intermodulation products from multiple input tones to a single mixer on the combined line. In the latter combined signal case, just where in the receiver chain to down-convert and how to perform this without excessive intermodulation ("IM") products blinding the receiver have been investigated.

A means of producing low frequency offsets with fewer IM products via low frequency ARFM in the first stage down-conversion allows a cleaner combination of signals that—after offsetting directly with the transmitted frequency also acting as local oscillator—yields video high enough for clean filtering and low enough for inexpensive ADC sampling, after which FFTs can break out each individual channel again for processing. Lower ARFM offsets than those chosen in the above embodiments for the ARFM are easily generated by reducing piezoelectric transducer drive, but IM products from a combined signal of these low frequencies fed to and created by the lone diode mixer can become an equivalent problem as noted in conventional frequency multiplexed designs in that discriminating which is signal or IM becomes a problem. Other factors, such as electronic attack, image frequencies, or frequency spurs from other sources will influence the implementation of the piezoelectric transducer drive. While independent channels all the way to digitization obviously require an ADC per channel, higher frequencies (, e.g., 21 MHz-236 MHz) require very high speed, higher cost, low-bit ADCs or additional down-conversion in more complex systems. The combination of ARFM low frequency offsets and frequency multiplexing provides for simplification of ADC operation in that all formerly independent channels have been combined into one waveform on one line, and given their low frequency, a single low cost, high-bit ADC can easily sample and digitize the input with proper filtering of the lone diode mixer used in second stage down-conversion.

One particular solution would be construction of high piezo-drive frequency ARFMs in the X to Ka-band range, further simplifying radar design by complete removal of any sensitive diode mixers (which have been reduced in number but not eliminated in studied designs). Since ARFMs are virtually impervious to high power damage their insertion would remove the need for protecting sensitive diode mixers, though LNAs and ADCs are still of concern. Depending on results of minimum-signal operation the need for LNAs might also be removed if small enough return RF signals continue to generate sufficiently measurable Brillouin scattering between RF and sound waves. Such a system would be the definition of simplify, virtually eliminating RF components from the radar after reception by the antenna.

FIG. 16 illustrates a first RADAR receiver 1600 employing low frequency ARFMs 100, first shown in FIG. 14, in accordance with another aspect of the present invention. The RADAR receiver 1600 is intended for use in a RADAR transceiver mounted on an airborne platform (not shown), although this is not material to the practice of the invention. Note that alternative ARFM embodiments may be employed in alternative RADAR embodiments. The ARFMs 100 allow low offset frequency modulation through a clean process, are free of intermodulation products, and provide only a single RF frequency output. Thus, simple signal combination from multiple channels to one could be achieved.

The RADAR receiver 1600 frequency multiplexes eight channels 1609 down to one channel 1624 with, in this case, the frequency staggering performed by ARFMs 100, rather than the RF diode mixers of conventional designs. The RADAR receiver 1600 adjusts the frequency divider/multiplier network (not shown) to offset the incoming RF in this ARFM frequency down-conversion such that each channel 1609 has a slightly different local oscillator ("LO") (or, in other words, VCO piezoelectric drive frequency) for downstream reception by a single ADC 1639. Each frequency and, thus, each channel 1624 is unique. The ADC speed of the ADC 1639 is chosen in order to satisfy Nyquist sampling for the highest frequency ARFM 100. Having combined all channels to save on parts we desire to separate each channel after reception by the ADC. What we have reduced in hardware we expand again in software. This implementation allows digital FFTs ("Fast Fourier Transforms") to be performed, thus separating each channel signal by the frequency at which it was staggered upstream. Having recovered each frequency we have identified each quadrant and polarization of the original signal as each unique frequency is associated to only one unique channel. All channel imbalance correction and calibration is then done digitally, not in the RF lines or components as is standard practice.

Note that the number of channels 1609 is not material to the practice of the invention. In the illustrated embodiment, there are eight channels 1609, but in many common RADARs there typically are only three channels. Some RADAR applications, such as an altimeter, there may be only a single channel for handling a single received radiowave signal received with a simple monopole, unpolarized antenna (not shown). In embodiments employing only a single channel, the combiner 1621 may be omitted.

Returning to FIG. 16, the RADAR receiver 1600 receives a RADAR signal 1603 via a conventional polarized, quadrapole antenna 1606 and eight receiver channels 1609, generally indicated. The ARFMs 100 shift the frequencies as described above. The ARFMs 100 may each be driven by a respective, dedicated oscillator 148 or a single oscillator 148, shown in FIG. 1. If the latter, then the output of the oscillator 148 will be conditioned by an amplifier/divider network (not shown) to meet operational requirements. The eight channels 1609 are then combined in the frequency combiner 1621, or some other means for frequency multiplexing, in conventional fashion into a single, combined channel 1624, generally indicated. The frequency combiner 1621 frequency multiplexes the signals on the eight channels 1609 on the single channel 1624 in conventional fashion.

Note that the ARFMs presented here therefore simplifies RADAR design by removing seven of eight Ka-band diode mixers in a conventional eight channel adaptive processing system in exchange for adding eight ARFMs (including their drive(s)), allowing cleaner combination of these channels thus placing multiple channels on one frequency multiplexed line with limited intermodulation products at low enough frequencies that inexpensive ADCs can sample and process yet high enough to filter the relatively few remaining byproducts of the lone diode mixer 1630. This one-line approach removes a number of downstream RF components further simplifying radar design.

The combined channel 1624 includes a low noise amplifier ("LNA") 1627, a balanced diode mixer, or "mixer", 1630, a bandpass filter 1633, an amplifier 1636, and an ADC 1639. The LNA 1627 amplifies the desired signal with a minimum of noise added in the amplification process. Note that LNAs such as the LNA 1627 are designed for various frequency bands, and so some selection will be exercised to match the particular LNA 1627 to the received signal. The diode mixer 1630 strips away the high frequency carrier and leaves the underlying information carried by the received signal. As will be appreciated by those in the art having the benefit of this disclosure, the transmitted RADAR signal sometimes includes a high frequency carrier on which information is piggy-backed. More particularly, in the case of RADAR, sometimes no information is piggy-backed on the carrier and only the Doppler component of the reflected signal is stripped off. At other times, the transmitted signal may be encoded for variety of reasons. A bandpass filter 1633 then filters out noise injected by the operation of the diode mixer 1630. The filtered signal is then amplified by the amplifier 1636 and converted by the ADC 1639 in conventional fashion.

As was previously mentioned, the RADAR receiver 1600 is intended for use in a RADAR transceiver mounted on an airborne platform. One such transceiver 1700 is shown in FIG. 17. The transceiver 1700 includes the receiver 1600 first shown in FIG. 16. However, each channel 1609 now includes a switch driver 1612/diode limiter 1615 combination that protects the channel 1609 from spurious high energy impulses. The diode limiters 1615 are the first line of defense in receiver protection. They protect against high pulse power spikes from, for example, an enemy jammer and are driven to turn on by the power of the spike that the diode limiter 1615 receives. Thus, they block any damaging power from reaching the rest of RADAR receiver 1600. Also, the diode limiters 1615 are turned off and on with a respective switch driver 1613 to protect the RADAR receiver 1600 from radar signals transmitted through the antenna 1606, where the same antenna 1606 is used to both receive and transmit.

The transmitter 1703 includes a crystal oscillator 1706, an active frequency multiplier 1709 with a coherent oscillator ("COHO") 1712, an upconverter iris-filter 1715, a coupler 1718, and a modulating transmitting wave tube ("MTWT") 1721. The RADAR signal is transmitted via the antenna 1606. A 5-way 0° power splitter 1724 takes an input signal and divides it up equally onto five lines with no phase shift—i.e., 0° phase shift. One of the split signals is output by the power splitter 1724 to the diode mixer 1630 and another to the coupler 1718.

More particularly, the crystal oscillator 1706 is usually a very low phase noise device from which frequency multiplication takes it up to the transmit frequency to send out the antenna 1606 as transmitted RADAR signal 1710. The frequency multiplier 1709 changes the frequency of the signal generated by the crystal oscillator 1706 in a series of multiplications to the desired frequency level for the transmitted RADAR signal 1710. The COHO 1712 is a coherent oscillator generally with a VCO (voltage controlled oscillator—that is, one that changes frequency with change in voltage) and a PLL (phase locked loop—to keep the frequency stable and locked to some reference). The COHO is in our case used to add some frequency agility to the transmit signal such that is may frequency hop, making it harder to detect and harder to jam by enemy countermeasures.

The coupler 1718 (e.g., 3 dB or 10 dB) is another kind of power splitter that does not always divide the input signal evenly but in a specific ratio –10 dB for example—that is, one route gets 10% of the total signal and the other gets 90%. The MTWT 1721 is a tube amplifier effective at the frequency of choice for this particular embodiment. It steals energy from input electrons to amplify a small RF signal input.

With the exception of the ARFMs 100, the components of the RADAR transceiver 1700 can be implemented using commercially available, off-the-shelf parts ("COTS") or parts that are otherwise commonly known and used in the art. The selection of the make and model will be implementation specific, depending upon the design constraints for the individual implementation. Table 1 lists the make and model for the COTS components of one particular implementation. Studies have shown that this particular embodiment can result in a reduction of 27-43 parts and a reduction of US$3,333-US$15,618 in cost. Note that the frequency combiner, COHO, and 35 GHz power splitter are not available off-the-shelf, but the design and fabrication of these types of parts are well known in the art.

TABLE 1

COTS Components for RADAR Transceiver of FIG. 17

| Component | Make & Model |
| --- | --- |
| Diode Limiters | CPI VDA1000B |
| LNA | WiseWave ALN-33144020-01 |
| Balanced Mixer | Quinstar QMB 35-35-K-K |
| Band Pass Filter | Mini-Circuits PLP-2.5 |
| Amplifier | Mini Circuits AMP-15 |
| ADC | Maxim 1426 10-bit 10 Msps, or Maxim 12553 14-bit 65 Msps |
| Crystal Oscillator | Wenzel 501-04677 |
| Active Frequency ×36 Multiplier | WiseWave FMA-34.7-0.2-36-3 |
| Upconverter Iris-Filter | SpaceLabs M1-35F |
| Coupler | WaveWise 3dB FCW-28352020-02 |
| MTWT | L3 M1280 |

FIG. 18 illustrates a direct video RADAR ("DVR") receiver 1800. The DVR receiver 1800 solves several problems of conventional RADAR designs and the RADAR design of FIG. 16-FIG. 17. The DVR receiver 1800 solves these problems with the addition of high frequency ARFMs 100 for a minimum in radar hardware and maximum simplification. High frequency ARFMs are those which operate near the transmit frequency, and the "nearness" will be a function of the frequency of transmission. A Ka-band 35 GHz RADAR would operate the high frequency ARFMs around 34.998 GHz each channel would be staggered. For example, each channel may be staggered at 34.984 GHz, 34.986 GHz, 34.988 GHz, 34.990 GHz all the way up to 34.998 GHz for a 2 MHz separation for the specific case of a 1 microsecond pulsewidth with 8-channels because it's spectrum is 2 MHz wide for it's main spectral lobe. For an X-band system the high ARFM would run around 10 GHz in a similar manner. These types of considerations are well known in the art and there application will be apparent to those skilled in the art having the benefit of this disclosure.

High frequency ARFM acousto-radio materials with lower speeds of sound produce longer material sound wavelengths at specific piezoelectric drive frequencies and thus wider spaced diffraction grating equivalent structures within the material. Not only piezoelectric-drive frequency but material properties of the chosen medium affect grating spacing. For the case of Lithium Niobate ($LiNbO_3$) a longitudinal wave propagated through that material travels at 6570 m/s while for shear wave propagation the speed of sound is nearly half at 3633 m/s. For the later propagation mode sound waves and thus grating spacing would be twice what it is for longitudinal mode propagation for the same piezo-drive frequency. Other materials such as $Hg_2Cl_2$ have speeds of sound of 350 m/s. So material choice will also affect grating spacing and allow the designer options for efficiency concerns, angular displacement and acousto-radio material dimensions.

As is the case with low piezoelectric-drive frequency ARFM operation, the frequency offset (as determined by the piezoelectric drive frequency) of each channel soon to be combined with neighboring channels in frequency multiplexed designs must be chosen so as to accommodate signal processing concerns for channel separation in the digital processor. Since the spectral bandwidth of a transmitted pulse is the inverse of that pulsewidth, the separation of each channel in frequency (as set by piezoelectric drive frequency) must be enough to maintain satisfactory spacing of received signal pulses in the frequency domain.

In this particular embodiment, the transmit carrier frequency is stripped off in one step with no intermodulation products otherwise associated with diode mixers (not shown). Again, the input piezo-drive frequencies are staggered in order to uniquely identify each channel downstream after frequency multiplexing and digitization. What remains is the desired baseband signal for sampling with a single ADC 1639. Given the large single-step down conversion there is no need for a second stage mix, filter and amplification process. Hence those components disappear leading to a simpler design with fewer parts, lower cost and enhanced capacity for miniaturization. Note that, given that the illustrated embodiments intend to frequency hop the carrier as a countermeasure, we will communicate that transmit frequency to the piezoelectric drives 125 in order to maintain a constant acceptable separation between transmit and receive frequency where variation will be due primarily to target Doppler shift. The DVR receiver 1800 can also be incorporated into a RADAR transceiver, such as the RADAR transceiver 1900 shown in FIG. 19.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An acousto-radio frequency modulator, comprising:
a radiowave waveguide;
an acousto-radio material positioned in the signal path of the radiowave waveguide; and
an acoustic source coupled to the acousto-radio material and capable of driving an acoustic signal through the acousto-radio material.

2. The acousto-radio frequency modulator of claim 1, wherein the radiowave waveguide is fabricated from brass or aluminum.

3. The acousto-radio frequency modulator of claim 1, wherein the acousto-radio material is Lithium Niobate or Tellurium Dioxide.

4. The acousto-radio frequency modulator of claim 1, wherein the acoustic source includes a signal generator.

5. The acousto-radio frequency modulator of claim 1, further comprising an acoustic absorber capping the acousto-radio material in the signal path.

6. The acousto-radio frequency modulator of claim 1, wherein the radiowave waveguide defines an aperture in a sidewall thereof and the acousto-radio material is positioned in the signal path through the aperture.

7. The acousto-radio frequency modulator of claim 6, wherein the acousto-radio material extends from the radiowave waveguide.

8. The acousto-radio frequency modulator of claim 6, wherein the aperture is plugged.

9. The acousto-radio frequency modulator of claim 1, wherein the radiowave waveguide includes an exit bend.

10. The acousto-radio frequency modulator of claim 9, wherein the acousto-radio material is positioned in the radiowave waveguide beyond the exit bend.

11. The acousto-radio frequency modulator of claim 9, wherein the acousto-radio material is positioned in the signal path beyond the exit bend of the radiowave waveguide.

12. The acousto-radio frequency modulator of claim 1, further comprising a second acousto-radio material positioned in the signal path of the radiowave waveguide through which an acoustic signal may be driven.

13. The acousto-radio frequency modulator of claim 12, wherein the acoustic source drives the acoustic signal through the second acousto-radio material.

14. The acousto-radio frequency modulator of claim 12, further comprising a second acoustic source coupled to the second acousto-radio material and capable of driving a second acoustic signal through the second acousto-radio material.

15. The acousto-radio frequency modulator of claim 1, wherein the acousto-radio material is positioned in the signal path flush with the inner wall of the radiowave waveguide.

16. The acousto-radio frequency modulator of claim 1, wherein acoustic source is coupled to the acousto-radio material through a wall of the radiowave waveguide.

17. The acousto-radio frequency modulator of claim 1, wherein the acousto-radio material is positioned in the radiowave waveguide at an angle relative to the signal path entering the radiowave waveguide.

18. The acousto-radio frequency modulator of claim 1, wherein the acoustic source comprises one of a piezo-transducer, a voltage controlled oscillator, and a crystal oscillator.

19. An acousto-radio frequency modulator, comprising:
means for guiding a radiowave;
means for acousto-radio modulating the frequency of the radiowave, the modulating means being positioned in the signal path of the radiowave guiding means; and
means for driving an acoustic signal through the modulating means.

20. The acousto-radio frequency modulator of claim 19, wherein the modulating means comprises a Lithium Niobate or Tellurium Dioxide acousto-radio material.

21. The acousto-radio frequency modulator of claim 19, wherein the driving means includes a signal generator.

22. The acousto-radio frequency modulator of claim 19, further comprising an acoustic absorber capping the modulating means in the signal path.

23. The acousto-radio frequency modulator of claim 19, wherein the radiowave guiding means defines an aperture in a sidewall thereof and the modulating means is positioned in the signal path through the aperture.

24. The acousto-radio frequency modulator of claim 19, wherein the radiowave guiding means includes an exit bend.

25. The acousto-radio frequency modulator of claim 19, further comprising a second modulating means positioned in the signal path of the radiowave guiding means through which an acoustic signal may be driven.

26. The acousto-radio frequency modulator of claim 19, wherein the modulating means is positioned in the signal path flush with the inner wall of the radiowave guiding means.

27. The acousto-radio frequency modulator of claim 19, wherein driving means is coupled to the modulating means through a wall of the radiowave guiding means.

28. The acousto-radio frequency modulator of claim 19, wherein the modulating means is positioned in the radiowave guiding means at an angle relative to the signal path entering the radiowave guiding means.

29. The acousto-radio frequency modulator of claim 19, wherein the driving means comprises one of a piezo-transducer, a voltage controlled oscillator, and a crystal oscillator.

30. An apparatus, comprising:
a plurality of acousto-radio frequency modulators, each capable of modulating a component of a received RADAR signal, wherein at least one of the plurality of acousto-radio frequency modulators comprises:
a radiowave waveguide;
an acousto-radio material positioned in the signal path of the radiowave waveguide; and
an acoustic source coupled to the acousto-radio material and capable of driving an acoustic signal through the acousto-radio material;
a frequency combiner capable of frequency multiplexing each of the components into a combined signal;
a filter capable of filtering the combined signal;
an amplifier capable of amplifying the filtered signal; and
an analog to digital converter capable of converting the amplified signal to a digital representation.

31. The apparatus of claim 30, wherein the acoustic source includes a signal generator.

32. The apparatus of claim 30, further comprising an acoustic absorber capping the acousto-radio material in the signal path.

33. The apparatus of claim 30, wherein the radiowave waveguide includes an exit bend.

34. The apparatus of claim 30, further comprising a second acousto-radio material positioned in the signal path of the radiowave waveguide through which an acoustic signal may be driven.

35. The apparatus of claim 30, wherein the acousto-radio material is positioned in the radiowave waveguide at an angle relative to the signal path entering the radiowave waveguide.

36. An apparatus, comprising:
a plurality of acousto-radio frequency modulators, each capable of modulating a component of a received RADAR signal, wherein at least one of the plurality of acousto-radio frequency modulators comprises:
means for guiding a radiowave;
means for modulating the radiowave, the modulating means being positioned in the signal path of the radiowave guiding means; and
means for driving an acoustic signal through the modulating means;
a frequency combiner capable of frequency multiplexing each of the components into a combined signal;
a filter capable of filtering the combined signal;
an amplifier capable of amplifying the filtered signal; and
an analog to digital converter capable of converting the amplified signal to a digital representation.

37. The apparatus of claim 36, wherein the driving means includes a signal generator.

38. The apparatus of claim 36, further comprising an acoustic absorber capping the modulating means in the signal path.

39. The apparatus of claim 36, wherein the radiowave guiding means includes an exit bend.

40. The apparatus of claim 36, further comprising a second modulating means positioned in the signal path of the radiowave guiding means through which an acoustic signal may be driven.

41. The apparatus of claim 36, wherein the modulating means is positioned in the radiowave guiding means at an angle relative to the signal path entering the radiowave guiding means.

42. An apparatus, comprising:
means for acousto-radio modulating the frequency of each of a plurality of components of a received RADAR signal, wherein the acousto-radio modulating means comprises:
a radiowave waveguide;
an acousto-radio material positioned in the signal path of the radiowave waveguide; and
an acoustic source coupled to the acousto-radio material and capable of driving an acoustic signal through the acousto-radio material;
means for frequency multiplexing each of the components into a combined signal;
means for filtering the combined signal;
means for amplifying the filtered signal; and
means for converting the amplified signal to a digital representation.

43. The apparatus of claim 42, wherein the acoustic source includes a signal generator.

44. The apparatus of claim 42, further comprising an acoustic absorber capping the acousto-radio material in the signal path.

45. The apparatus of claim 42, wherein the radiowave waveguide includes an exit bend.

46. The apparatus of claim 42, further comprising a second acousto-radio material positioned in the signal path of the radiowave waveguide through which an acoustic signal may be driven.

47. The apparatus of claim 42, wherein the acousto-radio material is positioned in the radiowave waveguide at an angle relative to the signal path entering the radiowave waveguide.

48. An apparatus, comprising:
means for acousto-radio modulating the frequency of each of a plurality of components of a received RADAR signal, wherein the acousto-radio modulating means comprises:
  means for guiding a radiowave;
  means for modulating the radiowave, the modulating means being positioned in the signal path of the radiowave guiding means; and
  means for driving an acoustic signal through the modulating means;
means for frequency multiplexing each of the components into a combined signal;
means for filtering the combined signal;
means for amplifying the filtered signal; and
means for converting the amplified signal to a digital representation.

49. The apparatus of claim 48, wherein the driving means includes a signal generator.

50. The apparatus of claim 48, further comprising an acoustic absorber capping the modulating means in the signal path.

51. The apparatus of claim 48, wherein the radiowave guiding means includes an exit bend.

52. The apparatus of claim 48, further comprising a second modulating means positioned in the signal path of the radiowave guiding means through which an acoustic signal may be driven.

53. The apparatus of claim 48, wherein the modulating means is positioned in the radiowave guiding means at an angle relative to the signal path entering the radiowave guiding means.

54. An apparatus, comprising:
an acousto-radio frequency modulator capable of modulating a component of a received RADAR signal, wherein the acousto-radio frequency modulator comprises:
  a radiowave waveguide;
  an acousto-radio material positioned in the signal path of the radiowave waveguide; and
  an acoustic source coupled to the acousto-radio material and capable of driving an acoustic signal through the acousto-radio material;
a filter capable of filtering the received signal;
an amplifier capable of amplifying the filtered signal; and
an analog to digital converter capable of converting the amplified signal to a digital representation.

55. An apparatus, comprising:
an acousto-radio frequency modulator capable of modulating a component of a received RADAR signal, wherein the acousto-radio frequency modulator comprises:
  means for guiding a radiowave;
  means for modulating the radiowave, the modulating means being positioned in the signal path of the radiowave guiding means; and
  means for driving an acoustic signal through the modulating means;
a filter capable of filtering the received signal;
an amplifier capable of amplifying the filtered signal; and
an analog to digital converter capable of converting the amplified signal to a digital representation.

* * * * *